United States Patent [19]

Browder

[11] 3,776,622
[45] Dec. 4, 1973

[54] SEQUENTIAL PICTURE APPARATUS WITH CONTINUOUS FILM FEED

[75] Inventor: Lewis B. Browder, Altadena, Calif.

[73] Assignee: Bell & Howell Company, Chicago, Ill.

[22] Filed: Oct. 6, 1972

[21] Appl. No.: 295,750

Related U.S. Application Data

[63] Continuation-in-part of Ser. No. 127,113, March 23, 1971.

[52] U.S. Cl. .................................. 352/119, 352/105
[51] Int. Cl. ........................................... G03b 41/04
[58] Field of Search .................... 352/105, 106, 119, 352/120

[56] References Cited
UNITED STATES PATENTS
3,262,750   7/1966   Bottani .............................. 352/119

Primary Examiner—Samuel S. Matthews
Assistant Examiner—Alan Mathews
Attorney—Luc P. Benoit

[57] ABSTRACT

A sequential picture apparatus, such as a motion picture camera, projector, viewer or scanner, or a microfilm reader, employs a film drive for continuously moving a film. The continuous film motion is compensated by a rotary prism having a predetermined overall diameter and a plurality of facets and having a first axis of rotation. The film is guided adjacent the rotary prism with the film sequentially facing the facets of the prism at the film guiding path. A rotary prism drive device has an effective diameter smaller than the overall diameter of the prism and has a second axis of rotation spaced from the first axis of rotation. The first axis of rotation of the prism extends through the rotary film drive means. The prism drive device is placed into driving engagement with the film adjacent the prism. The prism drive device continuously rotates the prism at the same angular velocity as the prism drive device whereby the prism is driven to compensate the continuous film motion.

23 Claims, 5 Drawing Figures

SEQUENTIAL PICTURE APPARATUS WITH CONTINUOUS FILM FEED

CROSS REFERENCE

The subject patent application is a continuation-in-part of my earlier Patent application Ser. No. 127,113, Sequential Picture Apparatus with Continuous Film Feed, filed Mar. 23, 1971, and assigned to the subject assignee.

BACKGROUND OF THE INVENTION

1. Field of the Invention

The subject invention relates to sequential picture apparatus, such as motion picture cameras, projectors, viewers or scanners or microfilm viewers and the like, and, more particularly, to sequential picture apparatus employing a continuously moving film.

2. Description of the Prior Art

The prior art and the subject invention are chiefly described herein in terms of motion picture apparatus. However, no limitation to such apparatus is thereby intended, since the invention is also applicable to microfilm readers and the like in which images are viewed from a continuously moving film or other continuously moving pictorial medium. The expression "sequential picture apparatus" is, therefore, employed herein to cover not only motion picture apparatus in which pictures in a sequence are typically interrelated, but also equipment, such as microfilm viewers, in which pictures are recorded or viewed in sequence but are not necessarily interrelated with each other. Moreover, no limitation to conventional pictures or images, such as readily visible pictures or images, is intended, as the continuous motion compensator structures herein disclosed may also be employed to compensate continuous motion of, for instance, focused holographic images.

The interest in continuous film feed motion picture apparatus has presisted since the inception of cinematography, inasmuch as a continuous film feed imposes less wear and tear on the film than intermittent film feed spstems are potentially provides a greatly improved operation.

Rotary prisms or polygons have long been recognized as effective optical rectifiers which compensate continuous film motion. In practice it is essential to the proper operation of the continuous film feed apparatus that the velocities of the film and of the compensator prism be kept in phase synchronism. The potentially most advantageous film and prism drive, therefore, is so-called isotransport in which the film drive sprocket or capstan and the prism act on the film at substantially the same location.

From a purely mechanical point of view, the most ideal isotransport is one in which the overall diameter of the compensator prism is substantially equal to the effective diameter of the film advance sprocket or capstan (see U.S. Pat. Nos. 2,325,131 and 2,461,718). A practical realization of such isotransports, however, requires prism materials that have a refractive index which by far exceeds practically attainable values.

Several solutions of the problem have therefore been proposed. One type of prior-art proposals suggests a provision of a special gear train between the film advance and the prism to permit a sprocket of a given effective diameter and a prism of another overall diameter to rotate in phase synchronism (see U.S. Pat. Nos. 2,008,973, 2,209,698, 2,262,808, 2,449,705, 2,476,504, 2,508,789, 3,196,457, 3,262,750). This proposal has generally been rejected as impractical for its high mechanical losses and its inadequate precision due to gear backlash and other irregularities.

Other proposals mount the unequal-diameter sprocket and prism on the same shaft for synchronous rotation and employ optical means for guiding the images to or from the film by way of the larger-diameter prism (see U.S. Pat. Nos. 2,397,730, 2,441,013, 3,259,448, 3,523,722). This proposal introduces additional optical losses and sources of error due to the presence of extra reflective surfaces and also makes for a very expensive construction. A similar proposal of the type shown in U.S. Pat. No. 2,482,179 provides a complicated film path, imposing wear on the film, in photographic apparatus where sprocket and prism are mounted on the same shaft.

A further family of proposals lengthens the optical path inside the prism by providing lens arrangement therein (see U.S. Pat. Nos. 2,817,995, 2,860,542, 3,539,251). These internal lens arrangements encumber the construction and operation of the prism and are fraught with optical limitations.

SUMMARY OF THE INVENTION

The subject invention overcomes the above mentioned disadvantages and is based on the discovery of solutions that, as practical tests have shown, overcomes the above mentioned problem with which the continuous motion picture art has been plagued for several decades.

From a generic aspect thereof, the subject invention resides in a sequential picture apparatus with film drive means for continuously moving a film. The invention according to this aspect resides, more specifically, in the improvement comprising, in combination, a rotary prism having a predetermined first overall diameter and a plurality of facets for compensating said continuous film motion, said rotary prism having a first axis of rotation, means for guiding said film along a path adjacent said rotary prism with said film sequentially facing said facets of said rotary prism at said path, rotary prism drive means having a predetermined second effective diameter being smaller than said first diameter, said rotary prism drive means having a second axis of rotation spaced from said first axis of rotation, said first axis of rotation extending through said rotary prism drive means, and said rotary prism drive means including means connected to said rotary prism for continuously rotating said prism at the same angular velocity at said prism drive means whereby to drive said prism to compensate said continuous film motion, means for placing said rotary prism drive means and said film into driving engagement adjacent said prism, and means for optically utilizing said film by way of said rotary prism.

From a more specific aspect thereof, the subject invention resides in a sequential picture apparatus employing a continuously moving film and comprising in combination a rotary prism having a predetermined first overall diameter and a plurality of facets for compensating the continuous film motion, said rotary prism having a first axis of rotation, means for guiding the film along a path adjacent the rotary prism with the film sequentially facing the facets of the rotary prism at the film guiding path, rotary film drive means having a predetermined second effective diameter being smaller than the above mentioned first overall diameter of the prism, said rotary film drive means having a second axis of rotation, and said first axis of rotation extending through said rotary film drive means, means for placing the rotary film drive means and the film into driving engagement adjacent the prism, means for continuously advancing said film, including rotary film drive means adapted to engage said film at a location spaced from said prism drive means means connected to the rotary prism and the rotary film drive means for continuously rotating the prism and the film drive means at equal angular velocities whereby to advance the film continuously along the film drive path and drive the prism to compensate the continuous film motion, and means for optically utilizing said film by way of said rotary prism.

From another aspect thereof, the invention resides in a sequential picture apparatus employing a continuously moving film, comprising in combination, a rotary prism having a predetermined first overall diameter and a plurality of facets for compensating said continuous film motion, said rotary prism having a first axis of rotation, means for guiding said film along a path adjacent said rotary prism with said film sequentially facing said facets of said rotary prism at said path, rotary prism drive means having a predetermined second effective diameter being smaller than said first diameter, said rotary prism drive means having a second axis of rotation spaced from said first axis of rotation, said first axis of rotation extending through said rotary prism drive means, and said rotary prism drive means including means connected to said rotary prism for continuously rotating said prism at the same angular velocity as said prism drive means whereby to drive said prism to compensate said continuous film motion, means for placing said rotary prism drive means and said film into driving engagement adjacent said prism, and means for optically utilizing said film by way of said rotary prism.

As mentioned above, the apparatus according to the subject invention include means for optically utilizing the film by way of the rotary prism. For example, if the sequential picture apparatus is a motion picture camera, and the film is a photosensitive motion picture film, then the latter means for optically utilizing the film may include a lens system for projecting scenes to be photographed onto the film by way of the rotating prism.

On the other hand, if the sequential picture apparatus is a projector, then the optical utilizing means under consideration may include a light source with condensor lenses, or a collimated light source, for illuminating a film having images recorded thereon, and a projector lens system. Alternatively, if the sequential picture apparatus is a television film scanner, then the optical utilizing means may include electro-optical scanning equipment of the type used in television scanners. Moreover, if the sequential picture apparatus is a microfilm viewer, then the optical utilizing means may, by way of example, comprise a light source for illuminating the microfilm images and a lens or lens-and-mirror device for viewing the illuminated microfilm images.

In a preferred embodiment of the subject invention, the means for rotating the prism and the rotary film drive means include means for intercoupling the prism and the rotary film drive means. These intercoupling means may, for instance, comprise a flexible shaft.

The phrase "continuously moving film" as herein employed is not necessarily intended to refer to the duration of the film movement. Rather, this phase is used in the sense of "non-intermittently moving film".

BRIEF DESCRIPTION OF THE DRAWINGS

The subject invention and its objects will become more readily apparent from the following detailed description of preferred embodiments thereof, illustrated by way of example in the accompanying drawings, in which like reference numerals designate like or functionally equivalent parts and, in which.

DESCRIPTION OF PREFERRED EMBODIMENTS

Figure 1:
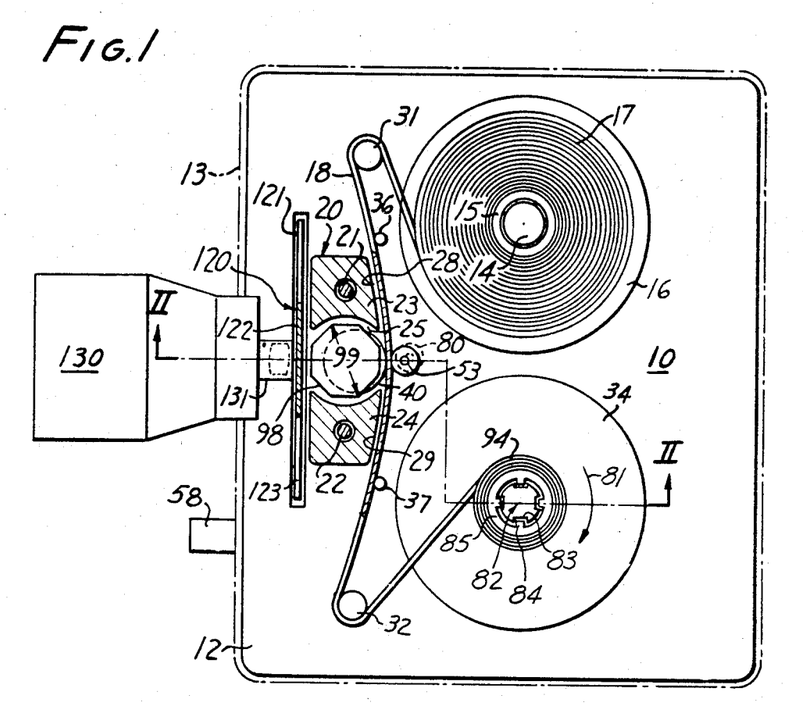
FIG. 1 is a side view, taken along the line I — I in FIG. 2, of a motion picture camera in accordance with a preferred embodiment of the subject invention.
Figure 2:
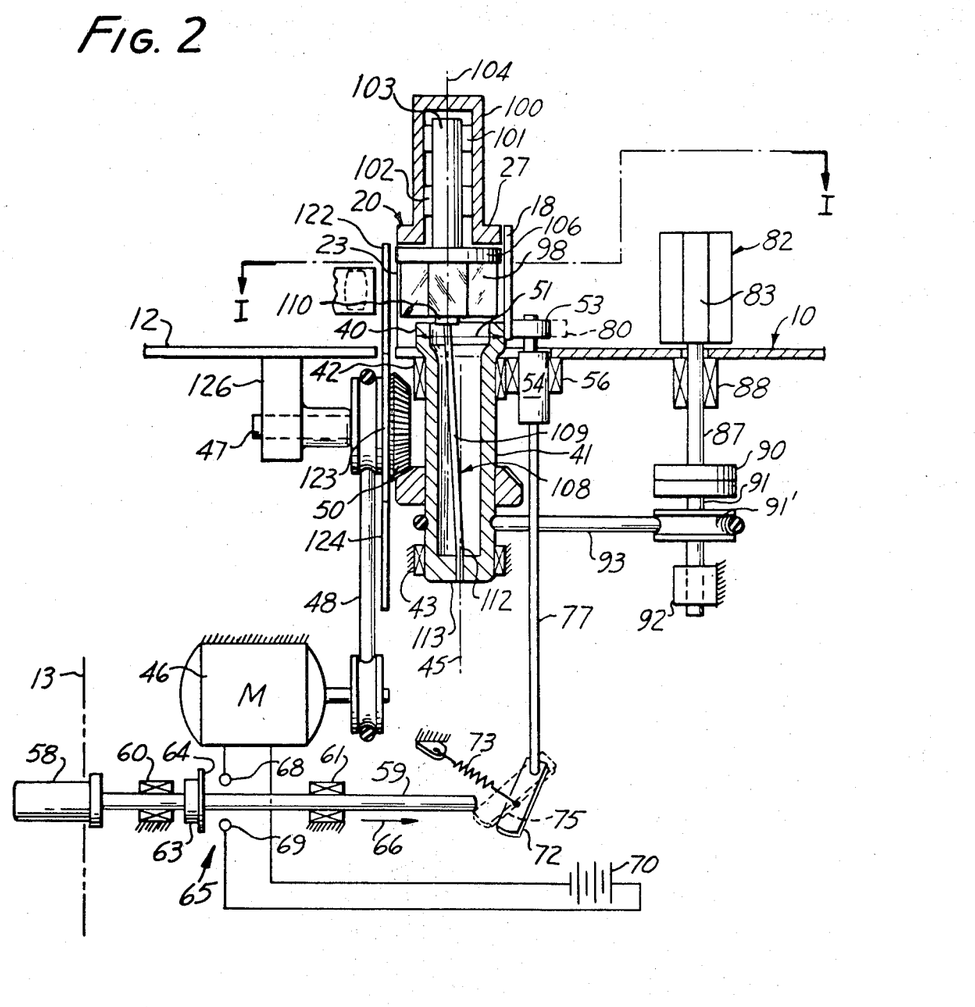
FIG. 2 is a view taken along the line II — II in FIG. 1.

The motion picture camera 10 shown in FIGS. 1 and 2 has a baseplate 12 for mounting the various parts thereof. In accordance with customary practice, the camera 10 also has a light-tight housing which, however, has only been indicated by a phantom line 13 since it has been removed for a showing of the camera construction.

The baseplate 12 carries a post 14 which has the hub 15 of a film supply reel 16 disposed thereon. The reel 16 carries a coil 17 of motion picture film 18 in a photosensitive or unexposed state.

A block 20 is attached to the baseplate 12 by a pair of screws 21 and 22. The block 20 has a pair of legs 23 and 24 defining a hollow space 25 therebetween, and a bridge 27 extending between the legs 23 and 24 and spanning the hollow space 25.

The block 20 defines surfaces 28 and 29 for guiding the motion picture film 18 past the hollow space 25. A post 31 is attached to the base 10 for guiding the film 18 from the supply reel 16 to the block 20, and a post 32 is attached to the baseplate 10 for guiding the film 18 from the block 20 to a takeup reel 34. A pair of pins 36 and 37 are attached to the baseplate 12 and serve the purpose of tensioning the film 18 against the film guiding surfaces 28 and 29 on the block 20.

The film 18 may either be advanced by a sprocket which engages sprocket holes (not shown) in the film or by means of a capstan which engages a margin of the film. A capstan drive has been chosen for the illustrated embodiment of the subject invention. As shown in FIG. 2, the capstan 40 is formed at the upper end of a tube 41 which is rotatably mounted relative to the baseplate 10 by a pair of stationary bearings 42 and 43 for rotation about an axis 45.

The capstan 40 is driven by an electric motor 46. Torque is transmitted from the motor 46 to a shaft 47 by a belt transmission 48 and from the shaft 47 to the tube 41 by a bevel gear 50.

The capstan 40 has a diameter 51 (see FIG. 2) which is dictated by the desired velocity of advancement of the film 18.

A pinch roller 53 serves to press the lower margin of the film 18 against the capstan 40 when advancement of the film 18 is desired. The pinch roller 53 is eccentrically mounted on a rotary mounting block 45 (e.g. a thick shaft) which is rotatably mounted relative to the base-plate 12 by a bearing 56.

For an understanding of the operation of the pinch roller 53 and rotary block 54, attention should be directed to the lower part of FIG. 2. As shown thereat, a camera release button 58 has a rod 59 attached thereto. The rod is mounted for sliding motion in a pair of stationary bearings 60 and 61. The rod 59 carries a piece of electrically insulating material 63, which, in turn, carries a contact blade 64 of an electric switch 65.

When the operator wishes to actuate the motion picture camera 10, he depresses the camera release button 58 whereby the shaft 59 is moved in the direction of arrow 66. This moves the blade 64 into engagement with a pair of contacts 68 and 69 of the switch 65. That switch is thus closed and connects the motor 46 to a source of electric current 70 which, for instance, may be an electric battery. The electric motor 46, which may be governor-controlled in a conventional manner, accordingly drives the capstan 40.

When moving in the direction indicated by the arrow 66, the shaft 59 also actuates a lever 72 against the bias of a spring 73 from a quiescent or initial position, shown by a dotted outline 75, to an advanced position shown in solid lines in FIG. 2. A shaft 77 interconnects the rotary block 45 and the lever 72 and transmits the motion of the lever 72 to the block 54 and thence to the pinch roller 53. It will be recognized at this juncture that the lever 72 has been shown in FIG. 2 in a perspective manner rather than strictly in side view, so as to reveal its nature and function more clearly.

As indicated in dotted outline 80 in FIGS. 1 and 2, the pinch roller 53 has a quiescent or initial position which corresponds to the quiescent or initial position 75 of the lever 72. In that initial or quiescent position, the pinch roller 80 is lifted off the film 18 so that there is insufficient frictional engagement of the pinch roller 40 with the film 18 for an advancement of the film, and so that the film may be inserted into, or removed from, the camera. Upon depression of the camera release button 58 the shaft 77 and the rotary mounting block 54 are rotated by action of the rod 59 on the lever 72, and the pinch roller 53 is moved to its solidly illustrated position because of its eccentric mounting on the block 54. The lower margin of the film 18 is thereby pressed against the capstan 40 for an advancement of the film 18 past the block cavity 25.

The advanced film 18 is coiled on a takeup reel 34 which is rotated by a spline 82 in the direction of an arrow 81. The spline 82 has grooves which accommodate tongues 84 of a hub 85 of the takeup reel for a force-transmitting engagement between the spline 82 and the takeup reel 34.

The spline 82 is mounted on a shaft 87 which, in turn, is rotatably mounted relative to the baseplate 12 by a bearing 88. Since the diameter of the coil of the film 94 forming on the takeup reel 34 increases as the advancement of the film 18 progresses, measures have to be taken to assure that the winding speed of the takeup reel varies accordingly. In practice, this problem is easily solved by providing a slip clutch 90 between the spline shaft 87 and a shaft 91, and by driving the shaft 91 at an angular velocity which is slightly higher than the maximum required angular velocity of the shaft 87.

A bearing 92 rotatably mounts the shaft 91 and a pulley 91' is disposed on and connected to that shaft. A belt 93 transmits torque from the capstan tube 41 to the pulley 91' for the rotation of the takeup reel 34. For the purpose of increased clarity, a showing of the reel 34 with hub 85 and coil 94 has been omitted in FIGS. 2, 4 and 5.

To compensate the continuous motion imparted by the capstan 40 to the film 18, a rotary prism 98 is provided. This rotary prism has a plurality of facets and has an overall diameter 99 measured between opposite edges.

Due to limitations in the refractive indexes of practically available prism materials, the overall diameter 99 of the prism 98 is larger than the effective diameter 51 of the film drive capstan 40. In contrast to the prior art, the subject invention, nevertheless, provides an isotransport for the film 18 relative to the prism 98 and the capstan 40.

To this effect, the bridge 27 of the block 20 carries a tube 100 which, in turn, carries a pair of bearings 101 and 102. The bearings 101 and 102 mount a shaft 103 for rotation about an axis 104. A circular prism mounting plate 106 is integral with the shaft 103. The prism 98 is cemented to the mounting plate 106.

To avoid a beating of the prism edges against the film 18, the diameter of the mounting plate 106 is preferably slightly larger than the overall diameter of the prism 99. In a prototype of the illustrated camera, the mounting plate 106 exceeded each prism edge by a distance of approximately 0.25 millimeters.

It will now be recognized that the film drive capstan 40 and the prism 98 are not mounted concentrically as in certain prior-art isotransports. Rather, the axis of rotation 45 of the film drive capstan 40 and the axis of rotation 104 of the rotary prism 98 are offset from one another. This may be expressed by saying that the rotary prism 96 has a first axis of rotation 104, and the rotary film drive means or capstan 40 has a second axis of rotation 45 spaced from the first axis of rotation 104. Both the capstan 40 and the prism 98 are mounted with peripheral portions thereof in close proximity to a tangential plane through the film 18. As clearly seen in FIGS. 2 and 4, the first axis of rotation 104 of the rotary prism 96 extends through the rotary film drive means or capstan 40.

The capstan 40 and the prism 98 are rotated in phase synchronism by means of a coupling 108 which intercouples the prism 98 and the capstan 40 by way of the tube 41. In the illustrated preferred embodiment, the coupling 108 includes a flexible shaft 109 having a first end portion 110 and a second end 112. The end portion 110 has the form of a disc which is cemented to the prism 98 concentrically with the axis of rotation 104. The shaft end 112 is fitted into a closed end 113 of the capstan tube 41 concentrically with the axis of rotation 45.

The flexible shaft 109 may be a single wire or a conventional flexible shaft composed of several wires. In a prototype of the illustrated camera, a beryllium-copper high-fatigue wire has been employed at 109.

Suitable glasses for the prism 98 in the practice of the subject invention include, by way of exaple, glasses having a refractive index above 1.5 and up to 1.85. These include, for instance, crown glass (BK8) having a refractive index of 1.5221, flint glass (BaSF2) having a refractive index of 1.6689, lanthanum crown glass (LaK14) having a refractive index of 1,6998, a glass known in the trade under the designation EK110 having a refractive index of 1.6998, a glass known in the trade as EK310 having a refractive index of 1.7172, and a glass known in the trade as EK450 having a refractive index of 1.8032. Useful comments on the choice of the prism glass are found in J. H. Waddell, Rotating Prism Design for Continuous Image Compensation Cameras, APPLIED OPTICS, Vol. 5, No. 7, July 1966, pp. 1211 to 23.

The camera further includes a rotary shutter 120 which is of a conventional design and has four shutter blades 121, 122, 123 and 124. The rotary shutter 120 is mounted on the shaft 47 for rotation therewith when driven by the electric motor 46 through the belt transmission 48. The shaft 47 is mounted relative to the baseplate 110 by one or more bearings 126, the height of which determined the position of the shutter blades relative to the optical path extending through the rotary prism 98. In accordance with conventional practice, this position is such that the blades 121 and 124 sequentially obscure that optical path. The above mentioned bevel gear 50 between the shaft 47 with shutter 120 and the capstan tube 41 assures that the shutter 120 is driven in phase synchronism with the capstan 40 and prism 98. In the illustrated preferred embodiment of the subject invention, the shutter 120 has four blades 121 to 124 and the prism 98 has eight prism facets. The bevel gear 50 is a step-down gear which drives the capstan 40 and the prism 98 at a velocity which is one-half the velocity of the shutter 120.

The camera 10 further includes a zoom lens 130 and an associated prime lens 131 which cooperate in imaging scenes to be photographed through the rotating prism 98 onto the film 18. In accordance with conventional practice, the camera 10 also preferably includes a viewer which permits the operator to view the scenes being photographed. This viewer has not been shown in the drawings since it may be of conventional design.

The guidance of the film 18 along the block 20 is such that the film sequentially faces the facets of the prism 98. It may also be said that the prism 98 is, located between the film 18 and the lens system 130 and 131, or between the film 18 and the shutter 120. What is important is that no optical equipment, such as prisms, mirrors, lenses, etc., is necessary to conduct the image from the rotating prism 98 to the film 18 (in a camera) or from the film 18 to the rotating prism 98 (in a projector or scanner). Rather, the prism 98 is immediately adjacent the film 18 and the drive capstan 40 is still in a direct engagement with the film at the prism 98 as shown.

Figure 3:
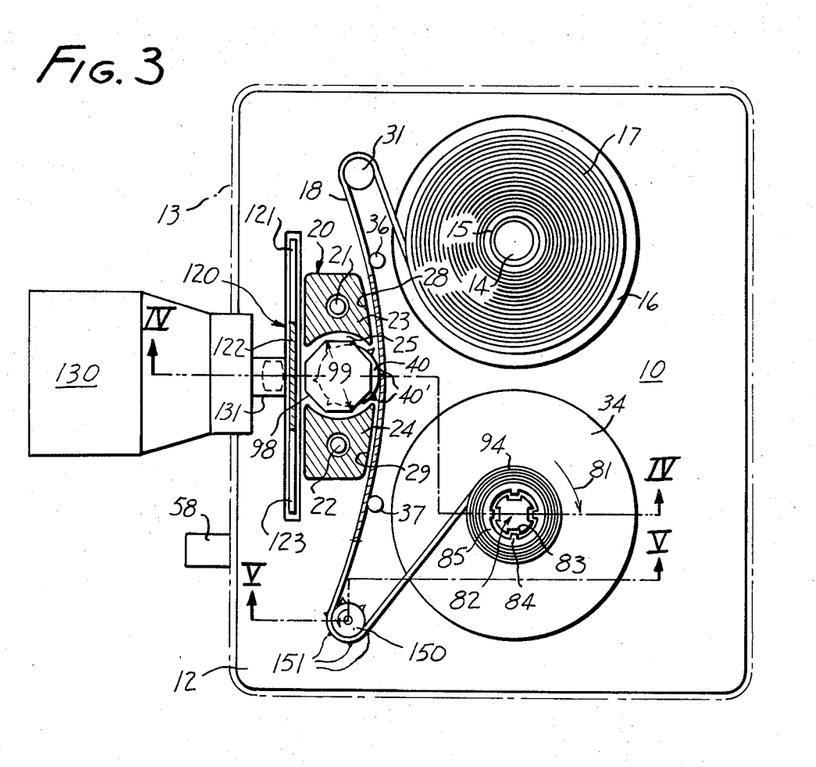
FIG. 3 is a side view taken along the line III — III in FIG. 4 in accordance with a further preferred embodiment of the invention.
Figure 4:
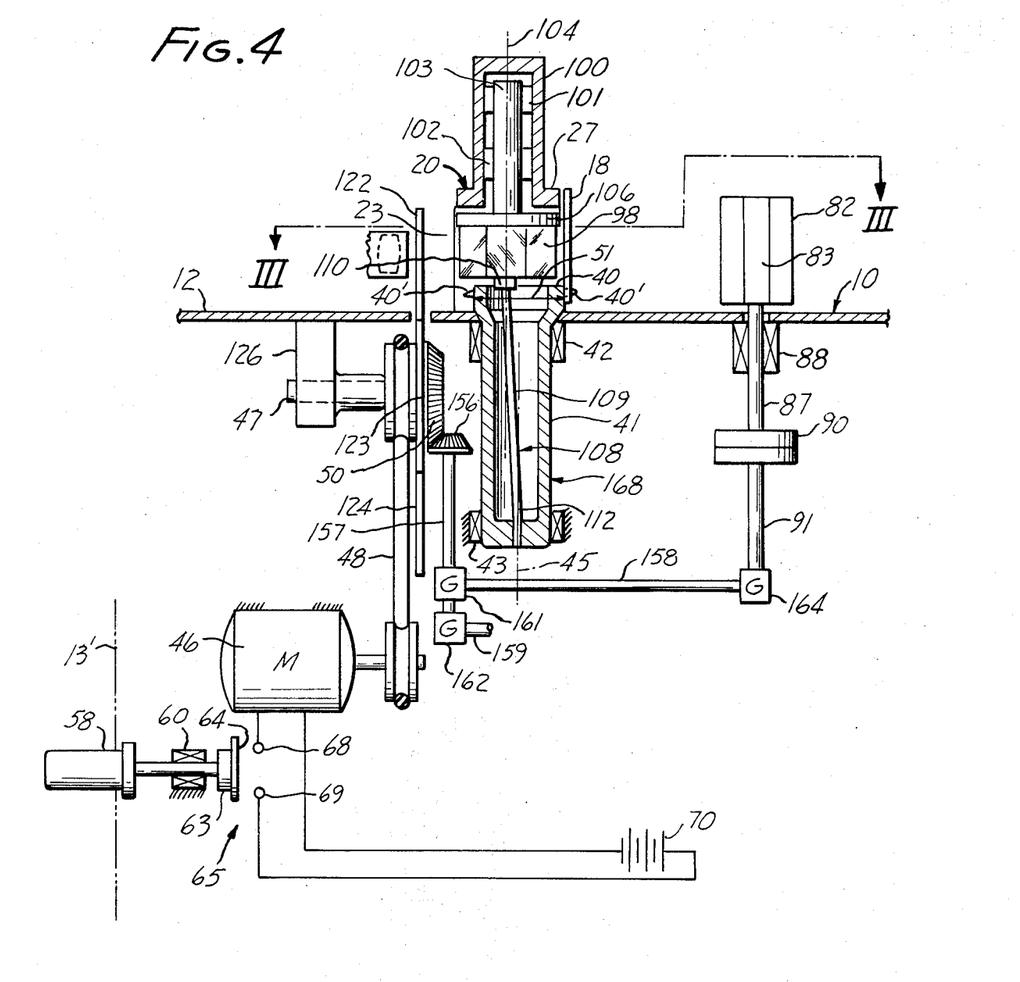
FIG. 4 is a view taken along the line IV — IV in FIG. 3.
Figure 5:
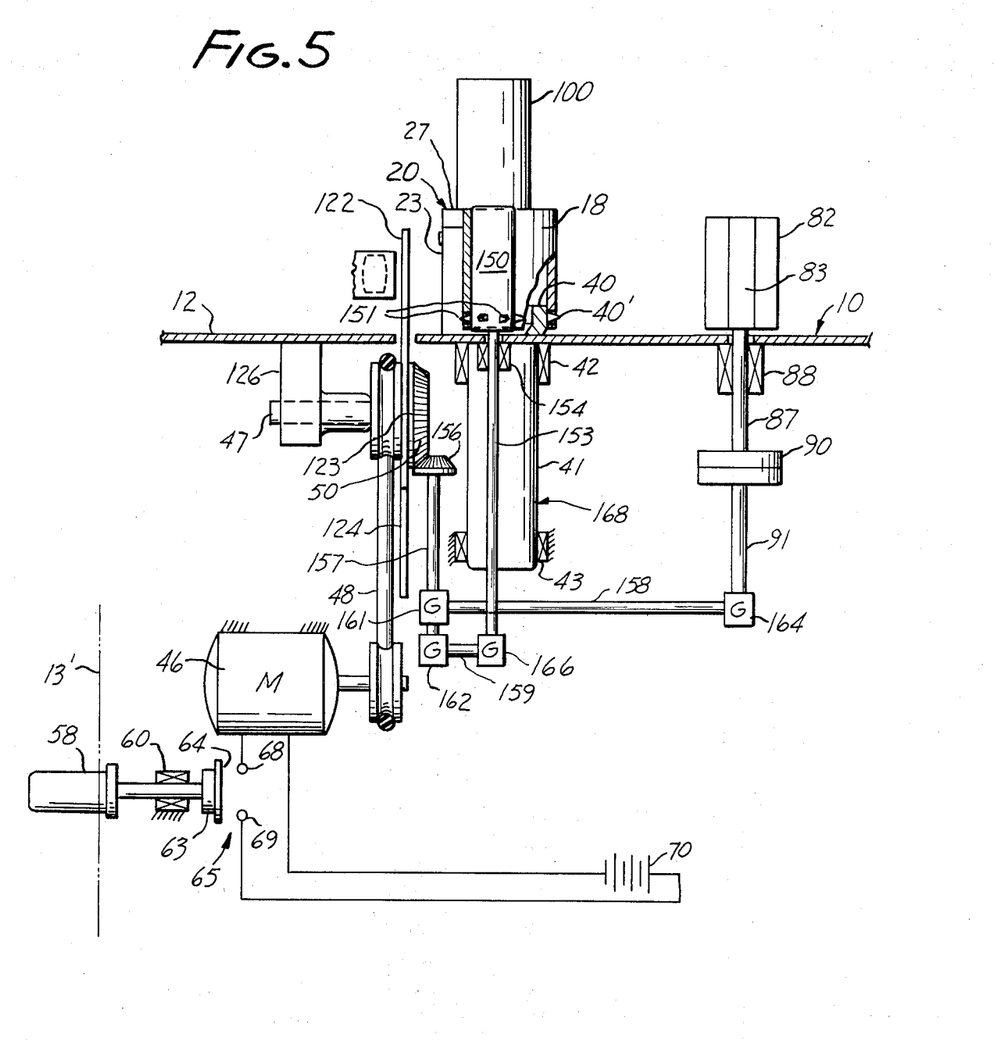
FIG. 5 is a view taken along the line V — V in FIG. 3.

A further preferred embodiment of the subject invention is shown in FIGS. 3 to 5.

According to FIGS. 3 to 5, and unlike FIGS. 1 and 2, the motion picture film 18 is not driven by the capstan 40. Rather, the film 18 is advanced by a sprocket wheel 150 which, in the embodiment of FIGS. 3 to 5, takes the place of the post 32 in the embodiment of FIGS. 1 and 2. A film drive capstan (not shown) may be employed instead of the sprocket wheel 150.

The sprocket wheel 150 has sprockets 151 engaging the film 18 at corresponding sprocket holes. As seen in FIG. 5, the sprocket wheel 150, shown in a somewhat simplified manner for increased clarity, is mounted on a shaft 153 which, in turn, is rotatably mounted in a bearing 154 attached to the base plate 12 of the camera 10.

A bevel pinion 156 meshes with the bevel gear 50. The pinion 156 rotates a shaft 157 which drives shaft 158 and 159 through gears 161 and 162. The shaft 158 drives the shaft 91 through a gear 164. This drives the film takeup spline 82 through the slip clutch 90 in the above mentioned manner for winding the advanced film.

The shaft 159 drives the shaft 153 through a gear 166 to rotate the sprocket wheel 150 for a continuous advancement of the film 18.

In the embodiment of FIGS. 1 and 2, the tube 41 with capstan 40 is a film drive means, as the tube 41 is coupled to and driven by the motor 46 and as the capstan 40 engages and advances the film 18. In the embodiment of FIGS. 3 to 5, the rim 40 does not drive the film 18. Rather, the sprocket wheel 150 is coupled to and driven by the motor 46 and, in turn, advances the film 18. The rim portion or capstan 40 and the tube 41 now become a prism drive 168. As seen in FIG. 4, the rim portion or capstan 40 still has the smaller diameter 51 relative to the larger overall diameter 99 of the prism 98. As seen in FIGS. 3 and 4, the rim portion 40 has sprockets 40' and is, in effect, a sprocket wheel.

The actuable pinch roller 53 with associated equipment is then not needed. On the other hand, if the filmed scenes are projected with a continuous projector having a synchronized compensator system of the type shown in my copending U.S. Patent application Ser. No. 132,956, filed Apr. 12, 1971 and assigned to the present assignee, then a capstan without sprockets may be used at 40. In either case, the capstan or sprocket wheel 40 and the tube 41 are now driven or rotated by the advancing film 18.

In the embodiment of FIGS. 3 to 5 the prism drive 168 includes the above mentioned coupling means 108 or flexible shaft 109, having a first end portion 110 connected to the prism 98 concentrically with the first axis 104 and having a second end portion 112 connected to the portion 41 of the prism drive 168, concentrically with the second axis 45. In the embodiment of FIGS. 3 to 5 the coupling means 108 or flexible shaft 109 constitute means for continuously rotating the prism 98 at the same angular velocity as the prism drive 168. In this manner, the prism drive 168, propelled by the advancing film 18, drives the prism 98 to compensate the continuous film motion.

The remaining parts and function of the embodiment of FIGS. 3 to 5 are the same as those of the embodiment of FIGS. 1 and 2.

As mentioned above, the subject invention may also be practised in equipment other than motion picture cameras. For instance, the isotransport with solid prism according to the subject invention may be substituted for the isotransport with hollow prism in the motion picture projector systems of U.S. Pat. No. 3,539,251, by D.W. Husted et al., issued Nov. 10, 1970, and herewith incorporated by reference herein. Alternatively, the isotransport according to the subject invention may be employed in a film viewer of the type shown in U.S. Pat. No. 2,461,718, by A.J. Bruno, issued Feb. 15, 1949, and herewith incorporated by reference herein. Moreover, the subject invention may be employed in the continuous film scanner described by E.H. Traub and J.F. Fisher, in Continuous Film Scanner for Monochrome or Color, ELECTRONICS, August 1954, pp. 152 to 157.

I claim:

1. In a sequential picture apparatus with film drive means for continuously moving a film, the improvement comprising in combination:
   a rotary prism having a predetermined first overall diameter and a plurality of facets for compensating said continuous film motion, said rotary prism having a first axis of rotation;
   means for guiding said film along a path adjacent said rotary prism with said film sequentially facing said facets of said rotary prism at said path;
   rotary prism drive means having a predetermined second effective diameter being smaller than said first diameter, said rotary prism drive means having a second axis of rotation spaced from said first axis of rotation, said first axis of rotation extending through said rotary prism drive means, and said rotary prism drive means including means connected to said rotary prism for continuously rotating said prism at the same angular velocity as said prism drive means whereby to drive said prism to compensate said continuous film motion;
   means for placing said rotary prism drive means and said film into driving engagement adjacent said prism; and
   means for optically utilizing said film by way of said rotary prism.

2. An apparatus as claimed in claim 1, wherein:
   said means for continuously rotating said prism include flexible shaft means extending and connected to said prism.

3. An apparatus as claimed in claim 1, wherein:
   said means for continuously rotating said prism include coupling means having a first end connected to said prism concentrically with said first axis of rotation and having a second end connected to a portion of said rotary film drive means concentrically with said second axis of rotation.

4. An apparatus as claimed in claim 3, wherein:
   said coupling means comprise flexible shaft means.

5. An apparatus as claimed in claim 1, wherein:
   said means for optically utilizing said film include shutter means and means for actuating said shutter means in synchronism with said rotary prism.

6. An apparatus as claimed in claim 1, wherein:
   said means for optically utilizing said film include rotary shutter means, means for mounting said rotary shutter means for rotation about an axis of rotation extending at an angle to the axis of rotation of said rotary prism, and means for rotating said rotary shutter means in synchronism with said rotary prism.

7. An apparatus as claimed in claim 1, wherein:
   said sequential picture apparatus is a motion picture camera; and
   said film is a photosensitive motion picture film.

8. A sequential picture apparatus employing a continuously moving film, comprising in combination:
   a rotary prism having a predetermined first overall diameter and a plurality of facets for compensating said continuous film motion said, rotary prism having a first axis of rotation;
   means for guiding said film along a path adjacent said rotary prism with said film sequentially facing said facets of said rotary prism at said path;
   rotary film drive means having a predetermined second effective diameter being smaller than said first diameter, said rotary film drive means having a second axis of rotation spaced from said first axis of rotation, and said first axis of rotation extending through said rotary film drive means;
   means for placing said rotary film drive means and said film into driving engagement adjacent said prism;
   means connected to said rotary prism and said rotary film drive means for continuously rotating said prism and said film drive means at equal angular velocities whereby to advance said film continuously along said path and drive said prism to compensate said continuous film motion; and
   means for optically utilizing said film by way of said rotary prism.

9. An apparatus as claimed in claim 8, wherein:
   said means for rotating said prism and said rotary film drive means include means for intercoupling said prism and said rotary film drive means.

10. An apparatus as claimed in claim 8, wherein:
    said means for rotating said prism and said rotary film drive means include flexible shaft means having a first end connected to said prism and a second end connected to said rotary film drive means.

11. An apparatus as claimed in claim 8, wherein:
    said means for rotating said prism and said rotary film drive means include coupling means having a first end connected to said prism concentrically with said first axis of rotation and having a second end connected to said rotary film drive means concentrically with said second axis of rotation.

12. An apparatus as claimed in claim 11, wherein:
    said coupling means comprise flexible shaft means.

13. An apparatus as claimed in claim 8, wherein:
    said rotary film drive means includes a film drive capstan.

14. An apparatus as claimed in claim 8, wherein:
    said means for optically utilizing said film include shutter means and means for actuating said shutter means in synchronism with said rotary prism.

15. An apparatus as claimed in claim 8, wherein:
    said means for optically utilizing said film include rotary shutter means, means for mounting said rotary shutter means for rotation about an axis of rotation extending at an angle to the axis of rotation of said rotary prism, and means for rotating said rotary shutter means in synchronism with said rotary prism.

16. An apparatus as claimed in claim 8, wherein:
    said sequential picture apparatus is a motion picture camera; and
    said film is a photosensitive motion picture film.

17. A sequential picture apparatus employing a continuously moving film, comprising in combination:
    a rotary prism having a predetermined first overall diameter and a plurality of facets for compensating said continuous film motion, said rotary prism having a first axis of rotation;
    means for guiding said film along a path adjacent said rotary prism with said film sequentially facing said facets of said rotary prism at said path;
    rotary prism drive means having a predetermined second effective diameter being smaller than said first diameter, said rotary prism drive means having a second axis of rotation spaced from said first axis of rotation, said first axis of rotation extending through said rotary prism drive means, and said rotary prism drive means including means connected to said rotary prism for continuously rotating said prism at the same angular velocity as said prism drive means whereby to drive said prism to compensate said continuous film motion;

means for placing said rotary prism drive means and said film into driving engagement adjacent said prism;

means for continously advancing said film, including rotary film drive means adapted to engage said film at a location spaced from said prism drive means; and means for optically utilizing said film by way of said rotary prism.

18. An apparatus as claimed in claim 17, wherein:
said means for continuously rotating said prism include flexible shaft means extending and connected to said prism.

19. An apparatus as claimed in claim 17, wherein:
said means for continuously rotating said prism include coupling means having a first end connected to said prism concentrically with said first axis of rotation and having a second end connected to a portion of said rotary film drive means concentrically with said second axis of rotation.

20. An apparatus as claimed in claim 17, wherein:
said coupling means comprises flexible shaft means.

21. An apparatus as claimed in claim 17, wherein:
said means for optically utilizing said film include shutter means and means for actuating said shutter means in synchronism with said rotary prism.

22. An apparatus as claimed in claim 17, wherein:
said means for optically utilizing said film include rotary shutter means, means for mounting said rotary shutter means for rotation about an axis of rotation extending at an angle to the axis of rotation of said rotary prism, and means for rotating said rotary shutter means in synchronism with said rotary prism.

23. An apparatus as claimed in claim 17, wherein:
said sequential picture apparatus is a motion picture camera; and
said film is a photosensitive motion picture film.

* * * * *